W. B. CARPENTER.
Process of Reducing Celluloid Tubes to Taper or other Forms.
No. 219,218.                Patented Sept. 2, 1879.
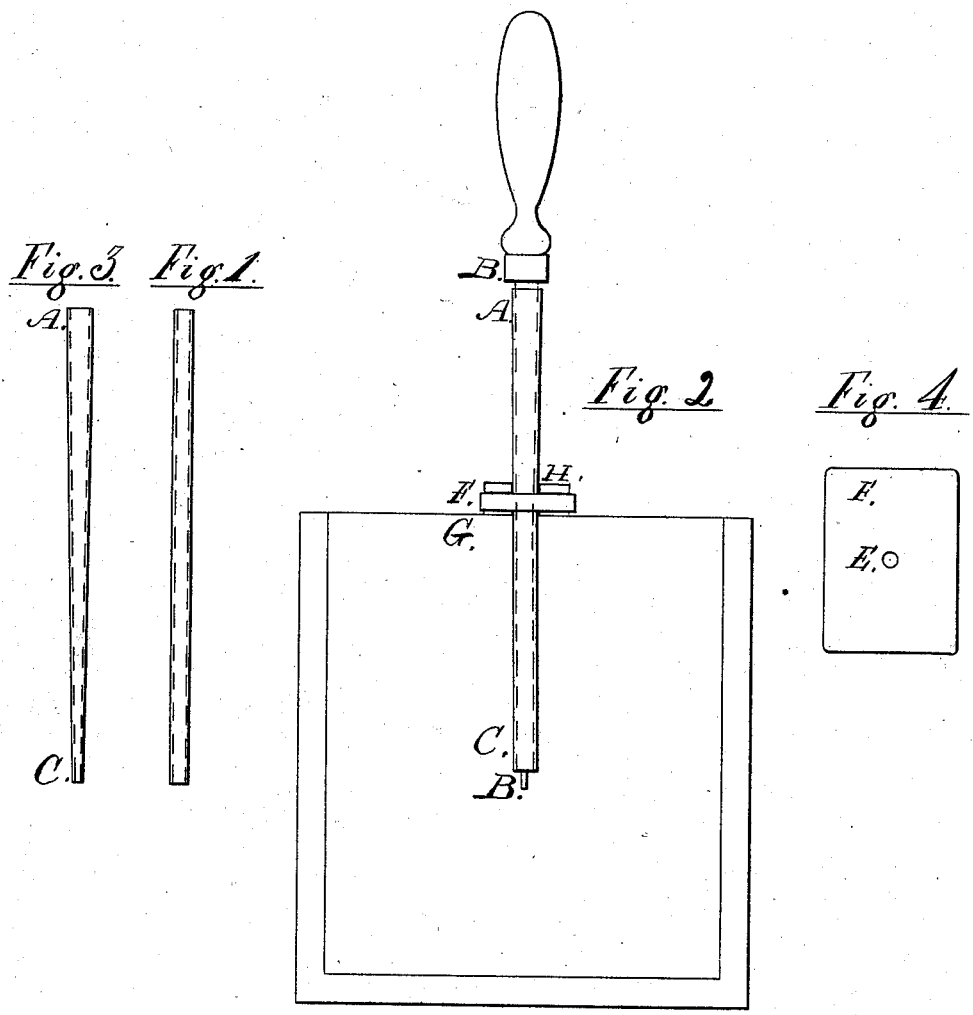

UNITED STATES PATENT OFFICE.

WILLIAM B. CARPENTER, OF NEWARK, N. J., ASSIGNOR TO HIMSELF AND CELLULOID NOVELTY COMPANY, OF SAME PLACE.

IMPROVEMENT IN PROCESSES OF REDUCING CELLULOID TUBES TO TAPER OR OTHER FORMS.

Specification forming part of Letters Patent No. 219,218, dated September 2, 1879; application filed June 28, 1879.

*To all whom it may concern:*

Be it known that I, WILLIAM B. CARPENTER, of Newark, in the county of Essex and State of New Jersey, have invented a new and useful Improvement in the Process of Reducing Tubes of Celluloid to Taper or other Forms, of which the following is a specification.

My invention relates to a process and mechanism of reducing tubes with parallel sides of celluloid, rubber, or other similar plastic material to a taper or other form, to be used for pen-holders or such purposes for which they may have an adaptation; and consists in heating, pressing, expanding, and contracting, in the use of suitable formers, as herein set forth.

It has not been difficult, and is not new, to expand such plastic tubes by thrusting a mandrel into them; but a difficulty has been found in reducing a tube to a desired size and form below its normal size; and to remedy this difficulty is the object of my invention, in connection with an outward expansion.

Referring to the drawings, Figure 1 shows a plain tube. Fig. 2 shows a tube in the process of being reduced to a taper. Fig. 3 shows one in taper form. Fig. 4 is a plan of an elastic die.

The tube, Fig. 1, is cut in proper length from tubes made of celluloid, rubber, or any plastic material that admits of being softened by heat and has tenacity enough to allow of being stretched and molded. This tube is taken, and one end, A, is held in hot water or some other hot liquid until it is pliable; then a mandrel having the desired taper or other shape is taken and plunged into the boiling liquid, and thence the end is stuck into soap to lubricate it, when it is pushed into the end of the tube that has been heated, the hand of the operator closing about the end, and holding it while the mandrel by the other hand is pushed into it. This mandrel expands the end A to its own shape; but as the other end of the mandrel does not fill the tube at the end C, this end has to be reduced to the size of the mandrel.

Fig. 2 shows a tube in the process of forming into a taper. The end A has been expanded; but the end C is not changed. This end, while it is hard, is stuck into soap or other lubricator, and is then pushed into a hole, E, in an elastic die, F, made usually of rubber; but some other elastic material may answer the same purpose. The tube is pressed into the die up to where the taper had been made by pushing the mandrel into it, or about one-half the length of the tube. The hole in this die is only the size of the small tip of the mandrel, but will stretch to the size of the tube while the tube is cold or hard. Then the mandrel and tube are placed in a vertical position, with the lower end up to the die in hot liquid, usually water, (see water-line G.) The die is then caught by an abutment or clamp, H, and is held firmly, and the upper end of the mandrel is connected with a suitable mechanism, by which it is drawn up slowly, at proper speed, carrying the tube that is being molded up with it; and as it is drawn up through the die the contraction of the die, pressing upon the softened celluloid, stretches it lengthwise and closes it about the form of the mandrel.

In pushing the mandrel into the tube it sometimes causes wrinkles in the tube; but this process of drawing the lower end of the tube through the die reduces any wrinkles that have been made above the die, making a smooth, symmetrical taper, as seen in Fig. 3.

After the die has been removed the tube is plunged into cold water, and is instantly cooled. Then it only remains to withdraw the mandrel, and the molded tube or article is ready to be finished for the use for which it was designed.

Thus it will be seen that where the tube is to be enlarged it gets the expansion by the pressure of the mandrel inside; but where it is to be diminished it is brought to a proper shape by the elastic die operating externally, in combination with the mandrel; and in this way many forms may be molded from a plain tube, getting the internal pressure from a solid mandrel and the external pressure from an elastic contracting-die, enlarging and contracting the parts as is found desirable. Therefore,

What I claim as my invention, and desire to secure by Letters Patent, is—

1. An elastic contracting-die made to operate on the external surface of a tube of plastic celluloid, or of other similar plastic material, in combination with a suitable mandrel pressed into the tube to mold the celluloid into forms above and below the normal size of the tube.

2. The process, substantially as herein set forth, of reducing a tube of celluloid, or of other similar plastic material, to a taper or other desired form by heating the tube in hot water or other liquid, and submitting it to an internal pressure by the mandrel B and an external pressure by the contracting-die F, substantially as specified.

WILLIAM B. CARPENTER.

Witnesses:
 HORACE HARRIS,
 GEORGE B. ADAMS.